United States Patent
Usui

[11] Patent Number: 5,887,628
[45] Date of Patent: Mar. 30, 1999

[54] HIGH PRESSURE FUEL INJECTION PIPE FOR DIESEL INTERNAL COMBUSTION ENGINE

[75] Inventor: Masayoshi Usui, Numazu, Japan

[73] Assignee: Usui Kokusai Sangyo Kaisha Limited, Japan

[21] Appl. No.: 839,294

[22] Filed: Apr. 17, 1997

[30] Foreign Application Priority Data

Apr. 22, 1996 [JP] Japan ................................. 8-124033

[51] Int. Cl.$^6$ ............................................. F16L 9/14
[52] U.S. Cl. ........................ 138/142; 138/143; 138/171; 138/177
[58] Field of Search ................................ 138/141, 142, 138/143, 144, 133, 134, 151, 171, 177

[56] References Cited

U.S. PATENT DOCUMENTS

| | | | |
|---|---|---|---|
| 2,508,465 | 5/1950 | Offinger et al. | 138/142 |
| 4,346,739 | 8/1982 | Asada | 138/143 |
| 4,784,311 | 11/1988 | Sugao | 138/142 |
| 4,943,489 | 7/1990 | Kuhara et al. | 138/143 |
| 5,265,793 | 11/1993 | Usui et al. | 138/143 |

*Primary Examiner*—Denise L. Ferensic
*Assistant Examiner*—James F. Hook
*Attorney, Agent, or Firm*—Anthony J. Casella; Gerald E. Hespos; Ludomir A. Budzyn

[57] ABSTRACT

A fuel injection pipe for a diesel engine which can sustain high internal pressure is provided. The inventive fuel injection pipe of a thick doublet pipe structure comprising an inner pipe and an outer pipe and having a thin inner diameter is arranged such that the inner pipe is formed out of a seam welded pipe made of a high tension steel plate and having a thickness of 0.4 to 1.5 mm and the outer pipe is formed out of a thick steel pipe made of the same material with the inner pipe or of carbon steel. Because the fuel injection pipe thus obtained allows inner facial wrinkles of the inner pipe to be suppressed to 25 μm or less in depth, it can fully sustain high internal pressure of 1200 bar or more.

9 Claims, 2 Drawing Sheets

HIGH PRESSURE FUEL INJECTION PIPE FOR DIESEL INTERNAL COMBUSTION ENGINE

BACKGROUND OF THE INVENTION

1. Field of the Invention

The present invention relates to a fuel injection pipe used as a fuel supplying path of a diesel internal combustion engine and more particularly to a thick high-pressure fuel injection pipe, whose diameter is relatively thin, of about 6.0 mm to 15.0 mm in diameter and about 2.2 mm to 5.5 mm in thickness.

2. Description of Related Art

While a steel pipe in the class of $340N/mm^2$ to $410N/mm^2$ of tensile strength had been used conventionally for a fuel injection pipe of a diesel engine, a high internal pressure of 1200 bar or more, which had been the maximum in the past, has come to be loaded to the fuel injection pipe and it has come to be required to have a higher fatigue strength to sustain the high internal pressure because a method of injecting high-pressure atomized fuel has come to be adopted to burn the fuel within engine cylinders more completely to exhaust cleaner exhaust gas along the development of the exhaust gas purifying technology conducted due to the restriction on exhaust gas of diesel engine. As a countermeasure thereof, there is a tendency of using a high tension steel in the class of $490N/mm^2$ to $800N/mm^2$ of tensile strength. Such a high tensile steel pipe is manufactured by drawing in general.

However, the high tension steel pipe manufactured by drawing sometimes causes fine wrinkles of about 100 $\mu m$ in depth on the inner surface thereof in tubing the pipe from hot ingot and in subsequently working the tube into a pipe having necessary dimensions by drawing (elongation). The wrinkles have been known to be caused by a difference of flows of the material inside and outside of the tube which arises when the tube is worked by reducing by a die from the outside of the tube and by rolling by a plug from the inside thereof. That is, such phenomenon occurs due to the deficiency of elongation which is caused by that the tension and the elongation (ductility and workability) are almost inversely proportional. It occurs remarkably in a thick tube. Further, because it has less ductility, the wrinkles on the inner part which is rolled by the plug also remain as wrinkle flaws. Especially when fine wrinkles of about 100 $\mu m$ in depth exist on the inner surface of the pipe, there has been a danger of causing a fatigue destruction and of bursting the pipe because concentration of stress occurs at the wrinkled portion when a high internal pressure exceeding 1200 bar is repeatedly applied within the pipe.

Further, because drawing reduction is limited per each drawing of the high tension steel pipe, it becomes necessary to draw high tension steel pipe a greater number of times in order to obtain a necessary dimensions of the pipe as compared with lower tension steel pipe. Therefore, there has been a problem that the production cost of the fuel injection pipe is high because, beside the low productivity thereof, it is obliged to increase equipment costs by installing a tube elongating machine, a swaging machine, a correcting machine and the like.

For example, in case of the high tension steel pipe in the class of $800N/mm^2$ of tensile strength, a cross-sectional reduction applicable in one time of drawing is limited to about 30% in the current facility. Therefore, in case of a typical seamless pipe of mother pipe size of $\phi 34$ mm, while it has been possible to finish it to a size of an injection pipe by four times of drawing (number of times of tube elongation) in the conventional class of $340N/mm^2$ to $410N/mm^2$ of tensile strength, it is necessary to draw eight times in case of the high tension steel pipe in the class of $800N/mm^2$ of tensile strength.

Further, in case of the high tension steel pipe in the class of $800N/mm^2$ of tensile strength, there has been a problem that various limits related to drawing of the high strength member such as the seizure of a tool such as a die, the burden placed on the swaging machine, the reduction of a number of pipes simultaneously drawn from the pipe elongating machine and the like must be solved, beside that it is obliged to increase the process.

SUMMARY OF THE INVENTION

Accordingly, it is an object of the present invention to solve the aforementioned problems by providing a fuel injection pipe made of high tension steel which can sustain a high internal pressure of 1200 bar or more by using a double-structured clad pipe composed of an inner pipe and an outer pipe, instead of the conventional fuel injection pipe formed out of a single-layered pipe.

The inventive fuel injection pipe for a diesel engine is characterized in that in the doublet pipe structure composed of the inner pipe and the outer pipe, the inner pipe is a seam welded pipe made of a high tension steel plate such as stainless steel or Mn steel and having a thickness of 0.4 to 1.5 mm and the outer pipe is a steel pipe made of the same material with the inner pipe or carbon steel.

The specific nature of the present invention, as well as other objects and advantages thereof, will clearly appear from the following description and from the accompanying drawings.

DESCRIPTION OF PREFERRED EMBODIMENTS

Figure 1:
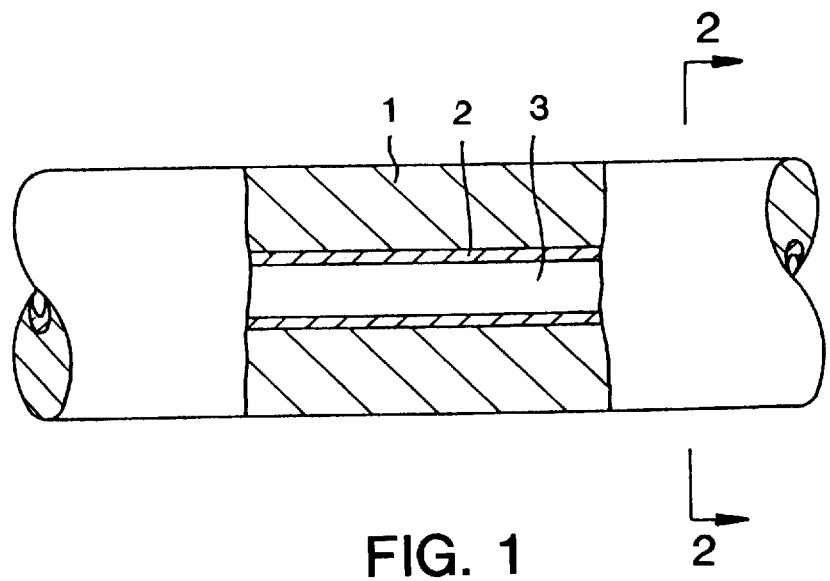
FIG. 1 is a partially cutaway enlarged section view showing one example of an inventive thick doublet metal pipe having a thin inner diameter.

In the present invention, a doublet pipe is used as a fuel injection pipe in order to be able to obtain a thick high-pressure fuel injection pipe having a relatively thin diameter where the fuel injection pipe is formed by less number of times of drawing than the prior art and to prevent fine wrinkles which might otherwise occur remarkably on the inner surface of a thick pipe.

Further, in this case, a seam welded pipe made of a high tension steel plate in the class of $490N/mm^2$ to $800N/mm^2$ of tensile strength such as stainless steel or Mn steel (steel containing Mn) and having a thickness of 0.4 to 1.5 mm is used due to the following reasons.

That is, because the seam welded pipe allows a cold rolled steel plate which initially has no wrinkles and whose surface condition is good to be used as the raw material, a pipe having a smooth inner surface may be fabricated while avoiding the factor of causing wrinkles (large workability) in fabricating a seamless pipe from an ingot such as with the prior art. Further, because the seam welded pipe allows the thickness of the inner pipe to be reduced to 0.4 to 1.5 mm, a difference of workability inside and outside of the thickness is small in elongating the pipe, allowing wrinkles to be suppressed to less than 25 μm in depth during elongation. It has been clarified by the research conducted by the inventor, et al. that a seam welded pipe having an outer diameter of φ6.4 mm and an inner diameter of φ1.8 mm has a high fatigue strength even if a high internal pressure of about 1700 bar is loaded within the pipe when a depth of the inner facial wrinkle is less than 25 μm.

Accordingly, when the seam welded pipe fabricated by using the high tension steel in the class of 490N/mm$^2$ to 800N/mm$^2$ of tensile strength such as stainless steel or Mn steel is used for the inner pipe, it can sustain the maximum stress on the inner surface of the pipe even if a large pipe internal pressure of about 1800 bar is applied, virtually eliminating the danger of bursting the pipe. In this case, it is a matter of course to keep the depth of wrinkles at the welding portion and portion effected by heat where there is the possibility of causing wrinkles most on the seam welded pipe to be less than 25 μm. It is noted that when the thickness of the inner pipe is less than 0.4 mm, an influence of the outer pipe is transmitted to the inner surface of the pipe and correction mark is created on the inner surface when the pipe is corrected to straighten it. When the thickness exceeds 1.5 mm on the other hand, the inner pipe acts like a mandrel, creating a gap between the inner pipe and the outer pipe.

Meanwhile, because the outer pipe is not required to have such a large fatigue strength against internal pressure like the inner pipe, it is possible to use a seamless pipe made of soft steel. However, using the high tension steel pipe of stainless steel and Mn steel corresponding to the required fatigue strength against internal pressure as the seamless pipe allows a long life to be obtained.

Figure 2:
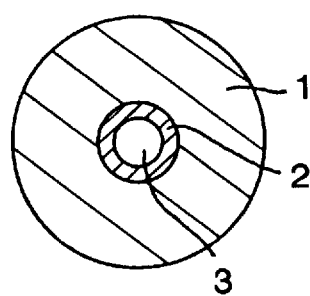
FIG. 2 is a longitudinal front view along 2—2 line in FIG. 1.

The present invention will be explained below with reference to the accompanying drawings. FIG. 1 is a partially cutaway enlarged section view showing one example of the inventive thick doublet metal pipe and FIG. 2 is a longitudinal front view along 2—2 line in FIG. 1. In the figure, the reference numeral (1) denotes the outer pipe, (2) the inner pipe and (3) a passage.

That is, the inventive doublet metal pipe comprises the relatively thick outer pipe 1 which has an outer diameter of about 15 mm or less and defines relatively small a a thin inner diameter and which is made of carbon steel or stainless steel for example and the thin inner pipe 2 which is press-fitted so as to be positioned inside of the outer pipe 1 to form the passage 3, which is made of a seam welded pipe of stainless steel and which has a thickness of 0.4 to 1.5 mm.

Because the inner pipe 2 formed out of the seam welded steel pipe is tubed by using a cold rolled steel plate (high tension steel) initially having no wrinkle and a good surface condition as its material and there is no wrinkles formed in tubing the seamless pipe from the ingot, it has a smooth inner surface prior to elongation. Because the thickness of the inner pipe is as thin as 0.4 to 1.5 mm, there is almost no possibility of causing wrinkles in elongating it.

EXAMPLES

Preferred embodiments of the present invention will be explained below.

First Embodiment

Figure 3:
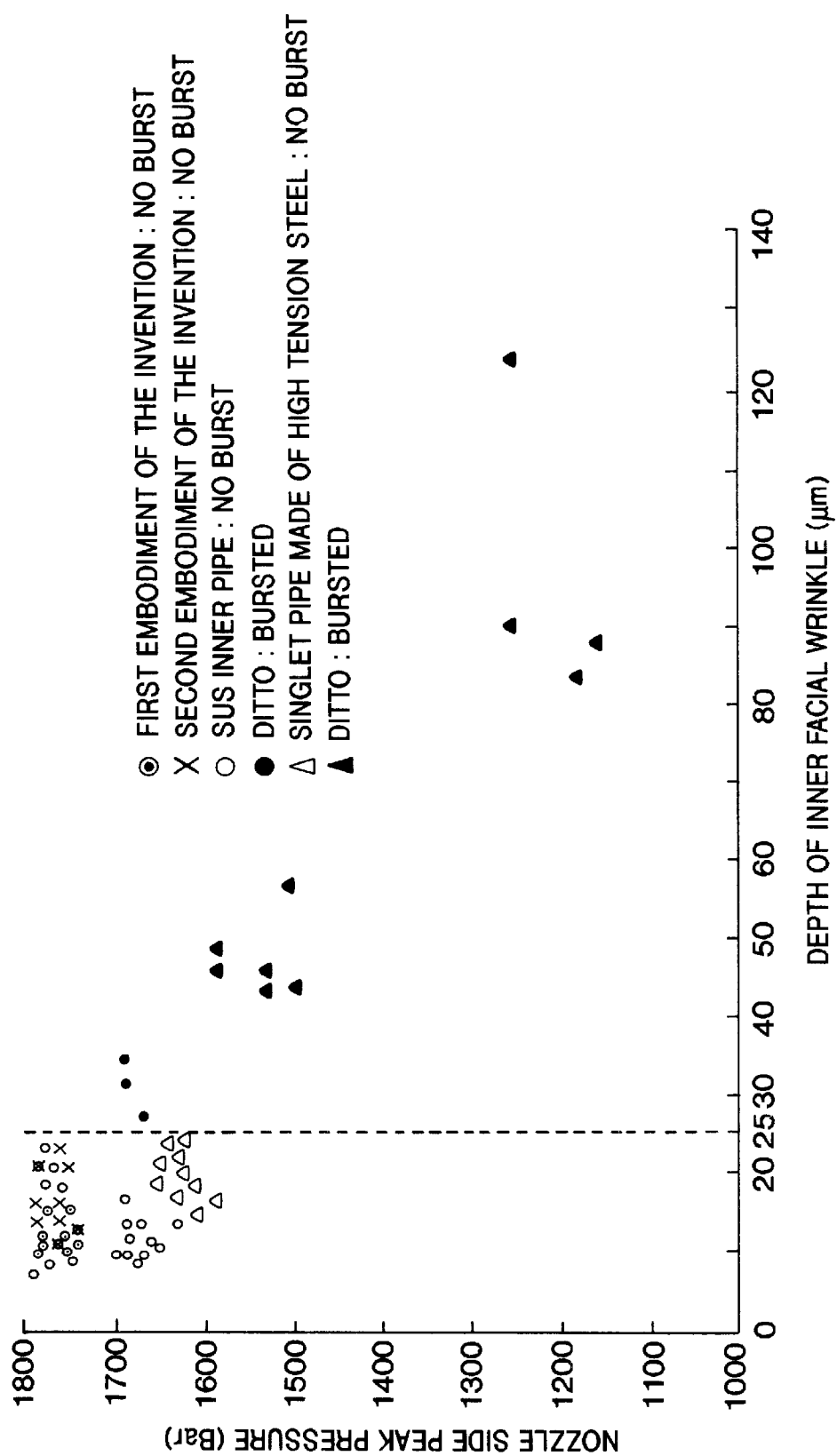
FIG. 3 is a graph showing a result of durability test of fuel injection pipes.

FIG. 3 is a graph showing a result of durability test of the fuel injection pipe comprising the outer pipe having a composition (soft steel) shown in Table 1 and dimensions of 6.4 mm in outer diameter, 1.8 mm in thickness and 2.8 mm in inner diameter and the inner pipe made of the seam welded pipe having a composition (high tension steel) shown also in Table 1, dimensions of 2.8 mm in outer diameter, 0.5 mm in thickness and 1.8 mm in inner diameter and the inner facial wrinkles of 25 μm or less in depth. This durability test result has been brought about by connecting the test fuel injection pipes to experimental fuel injection pumps, by connecting a nozzle holder at the edge of the fuel injection pipe and by implementing ten million times of injection test to each fuel injection pipe by using light oil as fuel.

TABLE 1

|  | C | Si | Mn | P | S | Cr | Mo |
|---|---|---|---|---|---|---|---|
| Inner Tube | 0.16 | 0.26 | 1.46 | 0.008 | 0.001 | 0.55 | 0.55 |
| Outer Tube | 0.08 | 0.28 | 0.45 | — | — | — |  |

Second Embodiment

FIG. 3 also shows a result of durability test of another fuel injection pipe comprising an outer pipe made of the same material with that of the first embodiment and having dimensions of 6.4 mm in outer diameter, 1.9 mm in thickness and 2.6 mm in inner diameter and an inner pipe formed out of a seam welded pipe of SUS 304 and having dimensions of 2.6 mm in outer diameter, 0.4 mm in thickness and 1.8 mm in inner diameter and inner facial wrinkles of 25 μm or less in depth. The testing method was the same with that of the first embodiment.

FIG. 3 also shows results of the similar durability tests implemented, for the purpose of comparison, on a fuel injection pipe using an outer pipe corresponding to a STS 35 and having the same outer diameter and thickness with that of the first embodiment and an inner pipe formed out of a seamless pipe (tensile strength: 800N/mm$^2$) made of a SUS 304 having inner facial wrinkles of 35 μm or less in depth and the same outer diameter, thickness and inner diameter with that of the first embodiment and on a fuel injection pipe formed out of a singlet pipe made of high tension steel having the same outer diameter and thickness with that described above (tensile strength: 490N/mm$^2$).

As it is apparent from the result shown in FIG. 3, in the case of the fuel injection pipe formed out of the singlet pipe made of high tension steel, while one having inner facial wrinkles of 25 μm or less in depth did not burst within a range of peak pressure on the nozzle side of 1600 to 1700 bar, one having inner facial wrinkles exceeding 40 μm in depth caused fatigue destruction and bursted due to the concentration of stress which occurred at the wrinkled portion around the above-mentioned peak pressure on the nozzle side. Also in the case of the doublet injection pipe, while it is equal to or better than the singlet fuel injection pipe described above because it can sustain internal pressure of 1800 bar in maximum when the inner facial wrinkle is 25 μm or less in depth, it caused fatigue destruction and bursted around 1700 bar when the inner facial wrinkle is 30 μm and more in depth.

In contrary to that, the fuel injection pipes of the first and second embodiments of the present invention using the seam welded pipe for the inner pipe caused no fatigue destruction and there was no danger of burst even if high internal pressure of around 1700 bar is applied within the pipe repeatedly by ten million times.

As described above, the fuel injection pipe for diesel engine of the present invention brings about the excellent effect that the concentration of stress caused by the inner facial wrinkles is reduced and the thin pipe conventionally designed may be used without causing any fatigue destruction by using the inner pipe which is fabricated by using the high tension steel plate in the class of 490N/mm² to 800N/mm² of tensile strength and by keeping the inner facial wrinkle to be 25 μm or less in depth.

While preferred embodiments have been explained, variations thereto will occur to those skilled in the art within the scope of the present inventive concepts which are delineated by the following claims.

What is claimed is:

1. A high-pressure fuel injection pipe for a diesel engine of a thick doublet pipe structure comprising a tubular inner pipe having first inner and first outer surfaces, said first inner surface defining a passage, and a tubular outer pipe having second inner and second outer surfaces, said inner and outer pipes being arranged such that said inner pipe is disposed within said outer pipe with said first outer surface engaging said second inner surface, wherein said inner pipe is a seam welded pipe made of a high tension steel plate and said inner pipe having an inner pipe thickness measured radially between said first inner surface and said first outer surface of 0.4 to 1.5 mm and wherein said outer pipe is a thick steel pipe.

2. The high-pressure fuel injection pipe according to claim 1, wherein said doublet pipe structure is made by press-fitting said inner pipe and said outer pipe by pipe elongation.

3. The high-pressure fuel injection pipe according to claim 1, wherein said inner pipe has a tensile strength in the class of 490N/mm² to 800N/mm².

4. The high-pressure fuel injection pipe according to claim 1, wherein said outer pipe is made of the same material with said inner pipe or carbon steel.

5. The high-pressure fuel injection pipe according to claim 1, having a diameter defined by said second outer surface of about 6.0 mm to 15 mm and an overall thickness measured radially between said first inner surface and said second outer surface of about 2.2 mm to 5.5 mm.

6. The high-pressure fuel injection pipe according to claim 1, wherein said seam welded pipe is tubed from a cold rolled steel plate.

7. The high-pressure fuel injection pipe according to claim 1, wherein said outer pipe is formed out of a seamless steel pipe.

8. The high-pressure fuel injection pipe according to claim 1, wherein said inner pipe is made of stainless steel or Mn steel.

9. The high-pressure fuel injection pipe according to claim 8, wherein said inner pipe has a tensile strength in the class of 490N/MM² to 800N/mm².

* * * * *